USO10759231B2

(12) United States Patent
Suga

(10) Patent No.: US 10,759,231 B2
(45) Date of Patent: *Sep. 1, 2020

(54) PNEUMATIC TIRE

(71) Applicant: The Yokohama Rubber Co., LTD., Minato-ku, Tokyo (JP)

(72) Inventor: Yuichi Suga, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 238 days.

This patent is subject to a terminal disclaimer.

(21) Appl. No.: 15/559,007

(22) PCT Filed: Mar. 15, 2016

(86) PCT No.: PCT/JP2016/058073
§ 371 (c)(1),
(2) Date: Sep. 15, 2017

(87) PCT Pub. No.: WO2016/148123
PCT Pub. Date: Sep. 22, 2016

(65) Prior Publication Data
US 2018/0079258 A1    Mar. 22, 2018

(30) Foreign Application Priority Data

Mar. 17, 2015    (JP) .................................. 2015-053586

(51) Int. Cl.
*B60C 11/00*    (2006.01)
*B60C 11/03*    (2006.01)
(Continued)

(52) U.S. Cl.
CPC ............ *B60C 11/0318* (2013.01); *B60C 5/00* (2013.01); *B60C 11/0083* (2013.01);
(Continued)

(58) Field of Classification Search
CPC ............. B60C 11/0083; B60C 11/0311; B60C 11/0304; B60C 11/0302; B60C 2011/0313; B60C 2011/0341
See application file for complete search history.

(56) References Cited

U.S. PATENT DOCUMENTS 4,840,210 A  *  6/1989  Kukimoto ................. B60C 3/06
                                                    152/209.9
2011/0048598 A1    3/2011  Ohki
(Continued)

FOREIGN PATENT DOCUMENTS

CN        103879236        6/2014
DE        44 44 970        6/1995
(Continued)

OTHER PUBLICATIONS

Translation of DE 4444970 of record (Year: 1995).*
(Continued)

*Primary Examiner* — Timothy Kennedy
*Assistant Examiner* — Alexander A Wang
(74) *Attorney, Agent, or Firm* — Thorpe North & Western

(57)    ABSTRACT

Provided is a pneumatic tire including center main grooves, shoulder main grooves, a center land portion, middle land portions, shoulder land portions, and lug grooves provided in each shoulder land portion. The pitch of the lug grooves is changed on the tire circumference. The profile line L1 that defines the road contact surface of the center land portion protrudes further to the outer side in the tire radial direction than the standard profile line L0. The profile line L2 that defines the road contact surface of the middle land portion and the shoulder land portion protrudes further to the outer side in the tire radial direction than the standard profile line L0. The ratio of the groove volume of the lug grooves to the size of the pitch of the lug grooves in the shoulder land portion decreases as the pitch increases, and increases as the pitch decreases.

8 Claims, 6 Drawing Sheets

(51) Int. Cl.
    *B60C 5/00*     (2006.01)
    *B60C 11/13*     (2006.01)

(52) U.S. Cl.
    CPC ...... *B60C 11/0304* (2013.01); *B60C 11/0306* (2013.01); *B60C 11/1307* (2013.01); *B60C 11/1376* (2013.01); *B60C 11/0302* (2013.01); *B60C 11/0311* (2013.01); *B60C 2011/0313* (2013.01); *B60C 2011/0325* (2013.01); *B60C 2011/0341* (2013.01); *B60C 2011/0358* (2013.01); *B60C 2011/0365* (2013.01); *B60C 2011/0367* (2013.01)

(56) References Cited

U.S. PATENT DOCUMENTS

| | | | |
|---|---|---|---|
| 2011/0180190 A1 | 7/2011 | Morita | |
| 2014/0166169 A1 | 6/2014 | Tanaka | |
| 2016/0009141 A1 | 1/2016 | Suga | |
| 2017/0174009 A1 | 6/2017 | Suga | |
| 2017/0297377 A1* | 10/2017 | Honda | ................ B60C 11/0304 |

FOREIGN PATENT DOCUMENTS

| | | |
|---|---|---|
| JP | H07-172107 | 7/1995 |
| JP | 2002-029216 | 1/2002 |
| JP | 2003-118317 | 4/2003 |
| JP | 2004-122904 | 4/2004 |
| JP | 2004-210133 | 7/2004 |
| JP | 2005-263180 | 9/2005 |
| JP | 2007-106295 | 4/2007 |
| JP | 2009-113768 | 5/2009 |
| JP | 2011-152845 | 8/2011 |
| JP | 2012-025192 | 2/2012 |
| JP | 2013-193512 | 9/2013 |
| WO | WO 2008/062640 | 5/2008 |
| WO | WO 2014/129647 | 8/2014 |
| WO | WO 2015/145909 | 10/2015 |

OTHER PUBLICATIONS

Lexico. Definitions for "arc" and "curve" https://www.lexico.com/en/definition/arc, https://www.lexico.com/en/definition/curve (Year: 2019).*

International Search Report for International Application No. PCT/JP2016/058073 dated May 24, 2016, 4 pages. Japan.

* cited by examiner

PNEUMATIC TIRE

TECHNICAL FIELD

The present technology relates to a pneumatic tire having four main grooves in a tread portion extending in the tire circumferential direction, and five rows of land portions demarcated by the main grooves, and in further detail, relates to a pneumatic tire that can improve handling stability and wear resistance, while avoiding degradation of uniformity.

BACKGROUND ART

There are pneumatic tires that have a plurality of main grooves in the tread portion extending in the tire circumferential direction, where a plurality of rows of land portions with rib trends are demarcated by the main grooves. With this type of pneumatic tire, the width of each land portion is generally set to be wide if there is a focus on handling stability. However, if the land portions are set to be wide, there is a tendency that the ground contact pressure will be relatively high at the edge portions of each land portion, and when driving under these conditions, the footprint length is reduced in the circumferential direction of the tire in a center portion of each land portion, and this is a factor that reduces handling stability.

In this regard, a proposal has been made to appropriately set the ground contact condition of each land portion, by projecting the road contact surface of the land portions demarcated by the main grooves in the tread portion, toward the outer side in the radial direction of the tire (for example, refer to Japanese Unexamined Patent Application Publication Nos. 2004-122904A, 2002-29216A or 2005-263180A).

However, even if the road contact surface of each land portion of the tread portion is projected to the outer side in the radial direction of the tire, the current condition is that improving the ground contact condition proximal to a shoulder main groove located on the outermost side in the tire width direction is difficult, and the effect of improving the handling stability cannot necessarily be sufficiently achieved.

Furthermore, the aforementioned pneumatic tires are required to simultaneously demonstrate excellent uneven wear resistance performance, in addition to excellent handling stability. In particular, there is a tendency for the shoulder land portion to undergo preferential wear as compared to the center land portion, and there is strong demand to prevent this type of uneven wear. However, a structure where the road contact surface of each land portion of the tread portion is projected to the outer side in the tire radial direction will not exhibit an effect of improving the uneven wear resistance.

SUMMARY

The present technology provides a pneumatic tire that can avoid degradation of uniformity while improving handling stability and uneven wear resistance.

The pneumatic tire of the present technology is a pneumatic tire where a pair of center main grooves extending in the tire circumferential direction are provided on both sides of an equatorial plane of the tire in a tread portion, a shoulder main groove extending in the tire circumferential direction is provided on an outer side in the tire width direction of each center main groove, a center land portion is demarcated between the center main grooves, a middle land portion is demarcated on the outer side in the tire width direction of the shoulder main grooves between the center main groove and the shoulder main groove, a shoulder land portion is demarcated on the outer side in the tire width direction of the shoulder main groove, a plurality of lug grooves extending in the tire width direction are provided in each shoulder land portion at intervals in the tire circumferential direction, and the pitch of these lug grooves is changed on the tire periphery; wherein from the viewpoint of the tire meridian cross section, when a standard profile line forming an arc of a circle that passes through both endpoints in the tire width direction of the pair of center main grooves is assumed, a profile line that defines the road contact surface of the center land portion protrudes further to the outer side in the tire radial direction than does the standard profile line, and a profile line that includes both endpoints in the tire width direction of the shoulder main grooves and the outer endpoint in the tire width direction of the center main groove, and that defines the road contact surface of the middle land portion and the shoulder land portion protrudes further to the outside in the tire radial direction than does the standard profile line, and the ratio of the groove area of the lug grooves to the size of the pitch of these lug grooves in the shoulder land portion is smaller as the pitch increases, and larger as the pitch decreases. Both endpoints of the center main grooves and both end points of the shoulder main grooves are inflection points between a tread surface of the tread portion and a groove sidewall of respective center and shoulder main grooves.

With the present technology, the profile line that defines the road contact surface of the center land portion protrudes further to the outer side in the tire radial direction than the standard profile line, and the profile line that defines the road contact surface of the middle land portion and the shoulder land portion protrudes further to the outer side in the tire radial direction than the standard profile line, and thereby the footprint length of the center land portion, middle land portion, and shoulder land portion can be ensured and the handling stability can be improved. In particular, the profile line that defines the road contact surface straddling the middle land portion and the shoulder land portion protrudes further to the outer side in the tire radial direction than does the standard profile line, and therefore the ground contact condition proximal to the shoulder main groove can be enhanced, and the handling stability can be effectively improved. Furthermore, with a structure where the profile line that defines the road contact surface straddling the middle land portion and the shoulder land portion protrudes further to the outer side in the tire radial direction than does the standard profile line, the change in the ground contact properties between the middle land portion and the shoulder land portion will be small, and therefore preferential wear of the shoulder land portion can be prevented and uneven wear resistance can be improved across the entire tread portion.

With a pneumatic tire having a plurality of lug grooves in each of the shoulder land portions and extending in the tire width direction, and where the pitch of the lug grooves changes on the tire circumference as described above, if the profile line that defines the road contact surface straddling the middle land portion and the shoulder land portion protrudes further to the outer side in the tire radial direction than the standard profile line, the rubber volume of the shoulder land portion will be increased and the nonuniformity of mass caused by the pitch variation will be amplified, and therefore the uniformity of the pneumatic tire will be degraded.

In order to avoid the aforementioned problems, with the present technology, the ratio of the groove volume of the lug groove to the size of the pitch of the lug grooves in the shoulder land portion decreases as the pitch increases, and increases as the pitch decreases. Thereby, the nonuniformity of mass caused by pitch variation is reduced, and the uniformity of the pneumatic tire can be favorably maintained.

With the present technology, the maximum projection amount to the outer side in the tire radial direction of the profile line of the center land portion with regard to the standard profile line is preferably from 0.2 mm to 0.5 mm. Thereby, there will not be promotion of uneven wear, the footprint length of the center land portion will be appropriately set, and the steering stability can be effectively improved.

On the other hand, the maximum projection amount to the outer side in the tire radial direction of the profile line of the middle land portion and the shoulder land portion with regard to the standard profile line is preferably from 0.6 mm to 2.0 mm. Thereby, there will not be promotion of uneven wear, the footprint length of the shoulder land portion will be appropriately set, and the steering stability can be effectively improved.

Furthermore, with a pneumatic tire where the mounting direction to the vehicle is specified, the maximum projection amount to the outer side in the tire radial direction of the profile line of the middle land portion and the shoulder land portion with respect to the standard profile line is preferably relatively larger on the outer side of the vehicle than on the inner side of the vehicle. The uneven wear resistance can be effectively improved by relatively increasing the maximum projection amount of the profile line of the middle land portion and the shoulder land portion on the vehicle outer side where the amount of wear is high during cornering.

With the present technology, it is essential that the ratio of the groove volume of the lug groove to the size of the pitch of the lug grooves in the shoulder land portion decreases as the pitch increases, and increases as the pitch decreases, but the following configuration can be adopted as the specific method. In other words, the ratio of the groove width of the lug groove to the size of the pitch of the lug grooves in the shoulder land portion can be made to decrease as the pitch increases, and to increase as the pitch decreases. Furthermore, the groove wall angle of the lug grooves in the shoulder land portion can be made to increase as the pitch increases, and to decrease as the pitch decreases. Furthermore, the groove depth of the lug grooves in the shoulder land portion can be made to decrease as the pitch increases, and to increase as the pitch decreases. These techniques can be applied individually or in combination.

In the present technology, the standard profile line is specified with the tire mounted on a regular rim and inflated to the regular internal pressure. The tire ground contact region of the tread portion is specified based on the ground contact width in the tire axial direction as measured when the tire is mounted on a regular rim and inflated to a regular internal pressure, and placed vertically upon a flat surface with a regular load applied. "Regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). "Regular internal pressure" is the air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "inflation pressure" in the case of ETRTO. "Regular internal pressure" is 180 kPa for a tire on a passenger vehicle. "Regular load" is a load defined by a standard for each tire according to a system of standards that includes standards on which tires are based, and refers to a "maximum load capacity" in the case of JATMA, to the maximum value in the table of "TIRE ROAD LIMITS AT VARIOUS COLD INFLATION PRESSURES" in the case of TRA, and to "LOAD CAPACITY" in the case of ETRTO. "Regular load" corresponds to 88% of the loads described above for a tire on a passenger vehicle.

DETAILED DESCRIPTION

Figure 1:
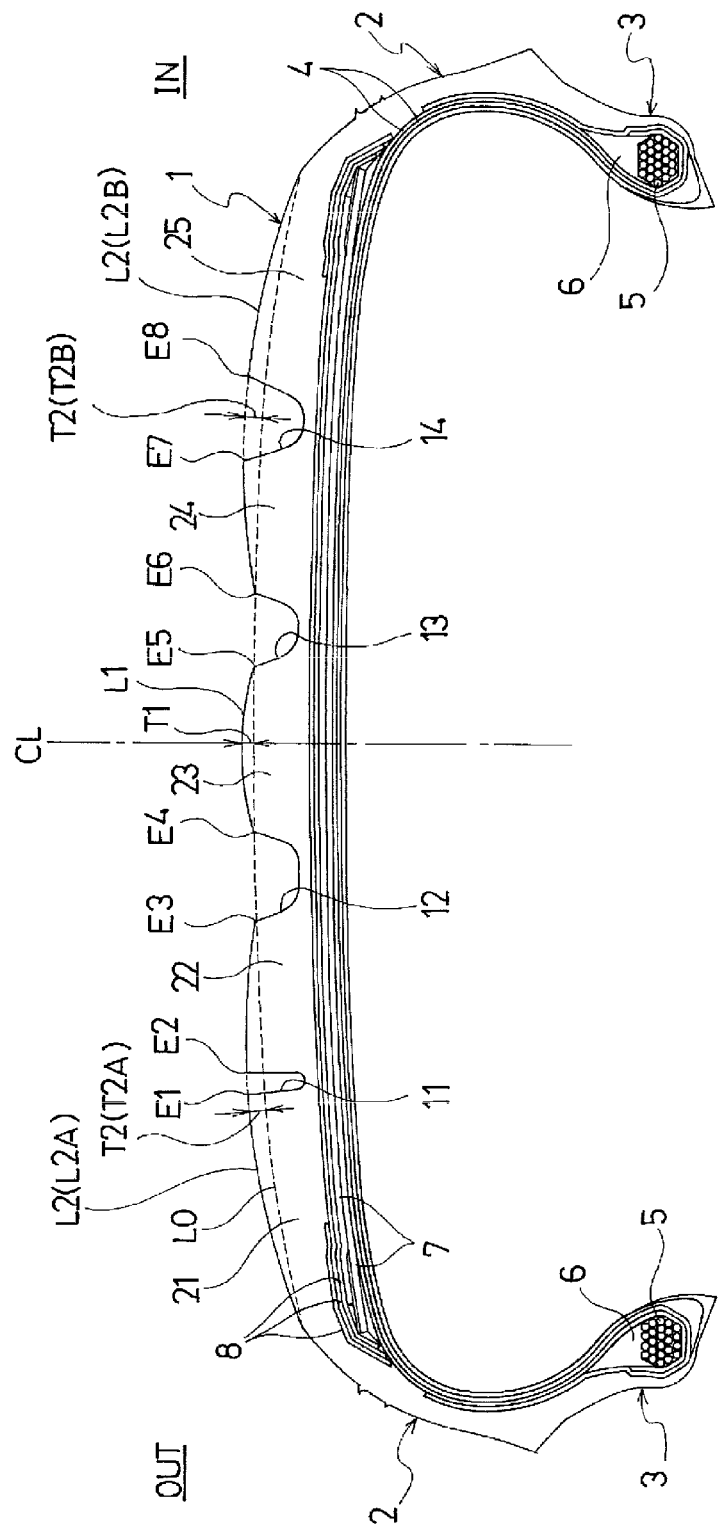
FIG. 1 is a meridian cross-sectional view illustrating a pneumatic tire according to an embodiment of the present technology.
Figure 2:
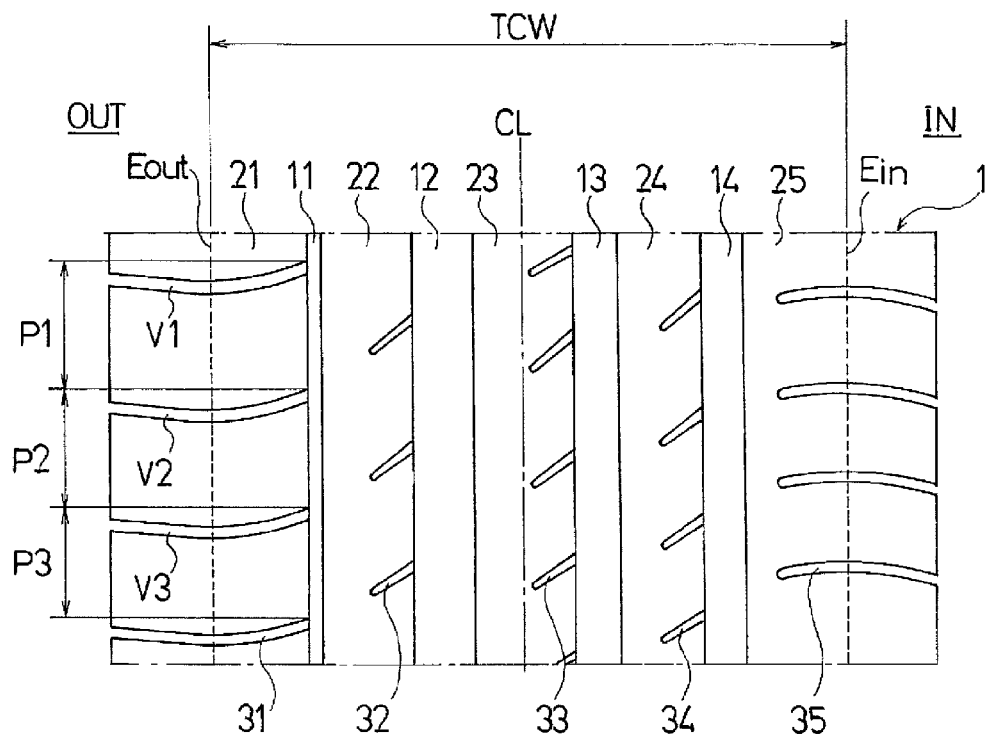
FIG. 2 is a developed view illustrating a tread pattern of the pneumatic tire according to the embodiment of the present technology.

The configuration of the present technology is described below in detail while referring to the accompanying drawings. FIGS. 1 and 2 illustrate a pneumatic tire according to an embodiment of the present technology. The pneumatic tire is a tire having a designated tire front/back mounting direction when mounted on a vehicle. In FIGS. 1 and 2, IN corresponds to the inner side of a vehicle when the pneumatic tire is mounted on the vehicle and OUT corresponds to the outer side of a vehicle when the pneumatic tire is mounted on the vehicle. The mounting direction on the vehicle is indicated at any position on the tire surface. Furthermore, CL denotes the tire equatorial plane.

As illustrated in FIG. 1, a pneumatic tire of this embodiment is provided with a tread portion 1 extending in the tire circumferential direction to form an annular shape, a pair of sidewall portions 2 that is disposed on both sides of the tread portion 2, 2, and a pair of bead portions 3 that is disposed on the inner side in the tire radial direction of the sidewall portions 3,3.

Two layers of a carcass layer 4 are mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on a circumference of the bead core 5.

On the other hand, a plurality of belt layers 7 are embedded on an outer circumferential side of the carcass layer 4 in the tread portion 1. These belt layers 7 include a plurality of reinforcing cords that incline with respect to the tire circumferential direction and the direction of the reinforcing cords of the different layers intersect each other. In the belt layers 7, an inclination angle of the reinforcing cords with respect to the tire circumferential direction is set in a range from, for example, 10° to 40°. Steel cords are preferably used as the reinforcing cords of the belt layers 7. For the purpose of improving high-speed durability, at least one layer of a belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above is exemplary of a pneumatic tire, but is not limited thereto.

As illustrated in FIG. 2, four main grooves 11, 12, 13, 14 extending in a tire circumferential direction are successively formed from the outer side of the vehicle to the inner side of the vehicle, in a tread portion 1. Five rows of land portions 21, 22, 23, 24, 25 are demarcated by the main grooves 11 to 14. More specifically, a pair of center main grooves 12, 13 on both sides of the tire equatorial plane CL, and shoulder main grooves 11, 14 on the outer side in the tire width direction of the center main grooves 12, 13 are provided in the tread portion 1. Therefore, the tread portion 1 has a shoulder land portion 21 demarcated on the outer side in the tire width direction of the shoulder main groove 11, a middle land portion 22 demarcated between the center main groove 12 and the shoulder main groove 11, a center land portion 23 demarcated between the center main grooves 12, 13, a middle land portion 24 demarcated between the center main groove 13 and the shoulder main groove 14, and a shoulder land portion 25 demarcated to the outer side in the tire width direction of the shoulder main groove 14. In FIG. 2, Ein and Eout indicate the ground contact edges on the vehicle outer side and the vehicle inner side, respectively, and the tread portion 1 forms a ground contact region with a ground contact width TCW.

A plurality of lug grooves 31 extending in the tire width direction are provided at intervals in the tire circumferential direction in the shoulder land portion 21 on the outer side of the vehicle. Each of the lug grooves 31 are formed such that one end extends further to the outer side in the tire width direction than the ground contact edge Eout, and the other end is connected to the shoulder main groove 11.

A plurality of closed grooves 32 extending in the tire width direction are provided at intervals in the tire circumferential direction in the middle land portion 22 on the outer side of the vehicle. Each of the closed grooves 32 has one end that is connected to the center main groove 12 located on the vehicle inner side of the middle land portion 22, and another end that is closed in the middle land portion 22.

A plurality of closed grooves 33 extending in the tire width direction are provided at intervals in the tire circumferential direction in the center land portion 23. Each of the closed grooves 33 has one end that is connected to the center main groove 13 located on the vehicle inner side of the center land portion 23, and another end that is closed in the center land portion 23.

A plurality of closed grooves 34 extending in the tire width direction are provided at intervals in the tire circumferential direction in the middle land portion 24 on the inner side of the vehicle. Each of the closed grooves 34 has one end that is connected to the shoulder main groove 14 located on the vehicle inner side of the middle land portion 24, and another end that is closed in the middle land portion 24.

A plurality of lug grooves 31 extending in the tire width direction are provided at intervals in the tire circumferential direction in the shoulder land portion 25 on the inner side of the vehicle. Each of the lug grooves 35 are formed such that one end extends further to the outer side in the tire width direction than the ground contact edge Ein, and the other end is not connected to the shoulder main groove 14.

In the center land portion 23, middle land portions 22, 24, and shoulder land portions 21, 25, the lug grooves 31, 35 and the closed grooves 32, 33, 34 are repetitively formed along the tire circumferential direction, but the pitch of the lug grooves 31, 35 and the closed grooves 32, 33, 34 changes at the tire circumference, and a so-called pitch variation is adopted. For example, in the shoulder land portion 21, the lug grooves 31 have at least three pitches P1 to P3 with different sizes. For example, there can be 3 to 6 different pitch sizes.

With the aforementioned pneumatic tire, as illustrated in FIG. 1, when viewed in a tire meridian cross section, if a standard profile line L0 is imagined as an arc of a circle that passes through both end points E3, E4, E5, E6 in the tire width direction of the pair of center main grooves 12, 13, a profile line L1 that is an arc of a circle that specifies the road contact surface of the center land portion 23 protrudes further to the outer side in the tire radial direction than the standard profile line L0, and a profile line L2 (L2A) that is an arc of a circle that specifies the road contact surface of the middle land portion 22 and the shoulder land portion 21 and that includes the endpoint E3 on the outer side in the tire width direction of the center main groove 12 and both endpoints E1, E2 in the tire width direction of the shoulder main groove 11 extends further to the outer side in the tire radial direction than the standard profile line L0, and a profile line L2 (L2B) that is an arc of a circle that specifies the road contact surface of the middle land portion 24 and the shoulder land portion 25 and that includes the endpoint E6 on the outer side in the tire width direction of the center main groove 13 and both endpoints E7, E8 in the tire width direction of the shoulder main groove 14 protrudes further to the outer side in the tire radial direction than the standard profile line L0. However, FIG. 1 depicts the contour shape in an exaggerated manner in order to make the characteristics of the tread portion 1 easier to understand, and the shape does not necessarily match the actual contour shape. Both endpoints of the center main grooves and both end points of the shoulder main grooves are inflection points between a tread surface of the tread portion and a groove sidewall of respective center and shoulder main grooves.

Incidentally, the region where the road contact surface of the shoulder land portions 21, 25 bulge further than the standard profile line L0 preferably extends further to the outer side then the ground contact edge of the tread portion 1, and the outer side edge in the tire width direction of the profile line L2 is preferably set within a range of 3% to 5% of the ground contact width TCW toward the outer side in the tire width direction from the ground contact edge of the tread portion 1.

With the aforementioned pneumatic tire, the profile line L1 that defines the road contact surface of the center land portion 23 protrudes further to the outer side in the tire radial direction than the standard profile line L0, and the profile line L2 (L2A, L2B) that defines the road contact surface of the middle land portions 22, 24 and the shoulder land portions 21, 25 protrudes further to the outer side in the tire radial direction than the standard profile line L0, and thereby the footprint length of the center land portion 23, middle land portions 22, 24 and shoulder land portions 21, 25 can be ensured, and the handling stability can be improved. In particular, the profile line L2 (L2A, L2B) that defines the road contact surface straddling the middle land portions 22, 24 and the shoulder land portions 21, 25 protrudes further to the outer side in the tire radial direction than does the standard profile line L0, and therefore the ground contact condition proximal to the shoulder main grooves 11, 14 can be enhanced, and the handling stability can be effectively improved. Furthermore, with a structure where the profile line L2 (L2A, L2B) protrudes further to the outer side in the tire radial direction than does the standard profile line L0, the change in the ground contact properties between neighboring middle land portion 22 and the shoulder portion 21 and between neighboring middle land portion 24 and the shoulder land portion 25 will be small, and therefore preferential wear of the shoulder land portions 21, 25 can be prevented and uneven wear resistance can be improved across the entire tread portion 1.

Figure 3:
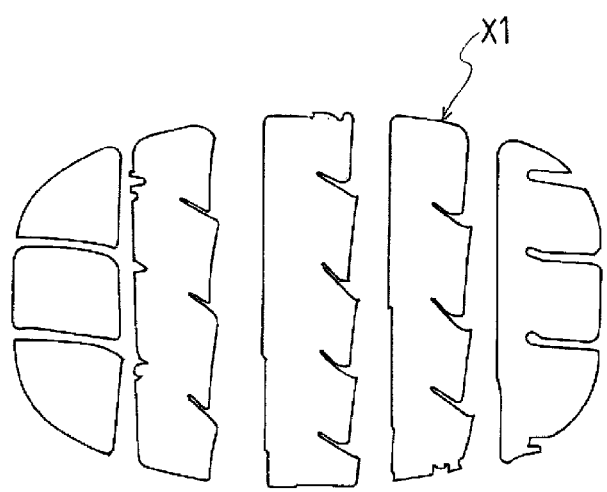
FIG. 3 is a plan view illustrating an example of a footprint of a pneumatic tire according to the present technology.
Figure 4:
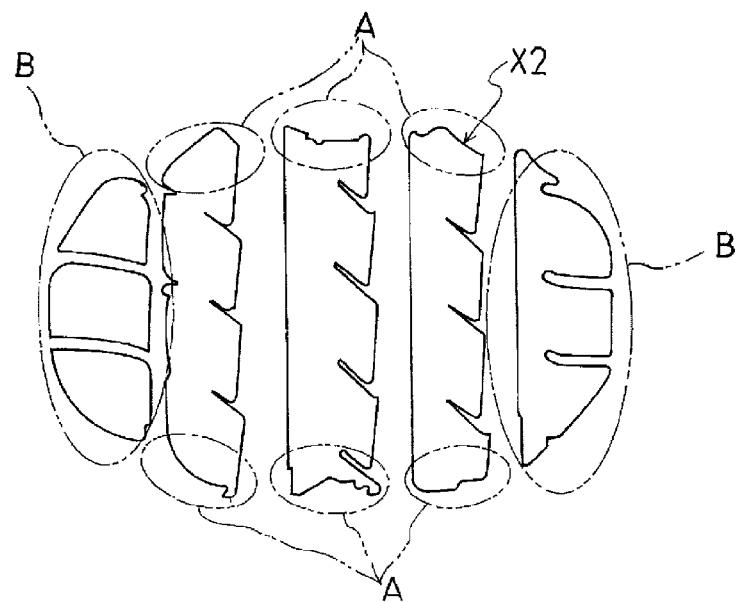
FIG. 4 is a plan view illustrating an example of a footprint of a pneumatic tire configured such that the profile line that defines the road contact surface of each land portion matches the standard profile line.
Figure 5:
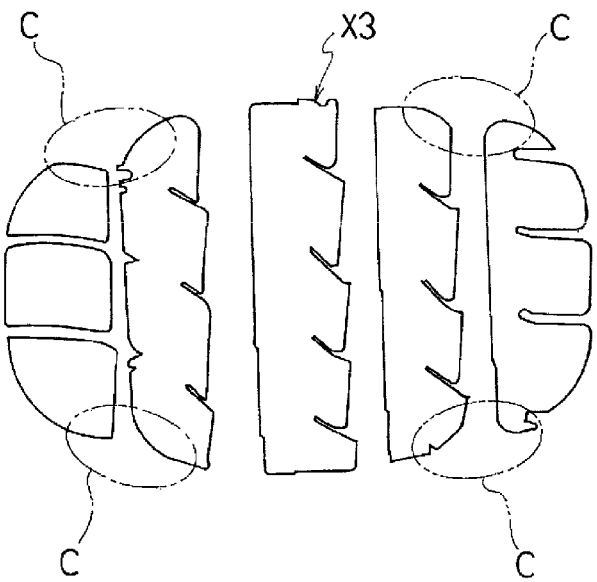
FIG. 5 is a plan view illustrating an example of a footprint of a pneumatic tire configured such that the profile line that defines the road contact surface of each land portion protrudes further to the outer side in the tire radial direction than the standard profile line.

FIG. 3 illustrates an example of a footprint of the pneumatic tire of the present technology, FIG. 4 illustrates an example of a footprint of a pneumatic tire configured such that the profile line that specifies the road contact surface of each land portion matches the standard profile line, and FIG. 5 illustrates an example of a footprint of a pneumatic tire configured such that the profile line that defines the road contact surface of each land portion protrudes further to the outer side in the tire radial direction than the standard profile line. As illustrated in FIG. 4, with the footprint X2 on a pneumatic tire where the road contact surface of each land portion does not protrude from the standard profile line, the footprint length of the center land portion and the middle land portion will be short (refer to part A), and the ground contact area of the shoulder land portion will be insufficient (refer to part B). On the other hand, as illustrated in FIG. 5, with the footprint X3 of a pneumatic tire where the road contact surface of each land portion protrudes from the standard profile line, the ground contact condition will be improved in the region corresponding to the aforementioned part A and part B. However, in FIG. 5, the footprint length is locally shorter proximal to the shoulder main groove (refer to part C). In this regard, it is understood that with the footprint X1 of the pneumatic tire of the present technology, the ground contact condition of the portion corresponding to part A and part B as well as the ground contact condition of the portion corresponding to part C are improved.

With the aforementioned pneumatic tire, the maximum projection amount T1 to the outer side in the tire radial direction of the profile line L1 of the center land portion 23 with regard to the standard profile line L0 is preferably from 0.2 mm to 0.5 mm. Thereby, the footprint length of the center land portion 23 will be appropriately set, and the steering stability on a dry road surface can be effectively improved. Herein, if the maximum projection amount T1 of the profile line L1 of the center land portion 23 is smaller than 0.2 mm, the footprint length of the center land portion 23 will be too short so the effect of improving the handling stability is reduced, but conversely if the maximum projection amount is larger than 0.5 mm, the footprint length of the center land portion 23 will be excessively long, and therefore the amount of wear of the center land portion 23 will be high.

On the other hand, the maximum projection amount T2 (T2A, T2B) to the outer side in the tire radial direction of the profile line L2 of the middle land portions 22, 24 and the shoulder land portions 21, 25 with regard to the standard profile line L0 is preferably from 0.6 mm to 2.0 mm. The footprint length of the shoulder land portions 21, 25 relative to the tread radius tends to be shorter than the footprint length of the center land portion 23, but by setting the maximum projection amount T2 to the aforementioned range, the footprint length of the shoulder land portions 22, 24 will be appropriately set, and the handling stability on a dry road surface (particularly the turnability and lane changeability) can be effectively improved. Herein, if the maximum projection amount T2 of the profile line L2 of the shoulder land portions 22, 24 is smaller than 0.6 mm, the footprint length of the shoulder land portions 22, 24 will be too short so the effect of improving the handling stability is reduced, but conversely if the maximum projection amount is larger than 2.0 mm, the footprint length of the shoulder land portions 22, 24 will be excessively long, and therefore the amount of wear of the shoulder land portions 22, 24 will be high.

In particular, with a pneumatic tire where the mounting direction to the vehicle is specified, the maximum projection amount T2A to the outer side in the tire radial direction of the profile line L2A of the shoulder land portion 21 and the middle land portion 22 on the outer side of the vehicle should be larger than the maximum projection amount T2B to the outer side in the tire radial direction of the profile line L2B of the middle land portion 24 and the shoulder land portion 25 on the inner side of the vehicle. The uneven wear resistance can be effectively improved by relatively increasing the maximum projection amount T2A of the profile line L2A of the middle land portion 22 and the shoulder land portion 21 on the vehicle outer side where the amount of wear is high during cornering. In this case, the maximum projection amount T2A is preferably set to a range of 0.7 mm to 2.0 mm, and the maximum projection amount T2B is preferably set to a range of 0.6 mm to 1.9 mm.

With a pneumatic tire having a plurality of lug grooves 31, 35 extending in the tire width direction in each of the shoulder land portions 21, 25, and where the pitch of the lug grooves 31, 35 changes on the tire circumference as described above, if the profile line L2 that defines the road contact surface straddling the middle land portions 22, 24 and the shoulder land portions 21, 25 protrudes further to the outer side in the tire radial direction than the standard profile line L0, the rubber volume of the shoulder land portions 21, 25 will be increased and the nonuniformity of mass caused by the pitch variation will be amplified, and therefore the uniformity of the pneumatic tire will tend to be degraded.

In order to avoid the aforementioned problems, with the aforementioned pneumatic tire, the ratio of the groove volume of the lug grooves 31, 35 to the size of the pitch of the lug grooves 31, 35 in the shoulder land portions 21, 25 decreases as the pitch increases, and increases as the pitch decreases. For example, in FIG. 2, if the lug groove 31 of the shoulder land portion 21 has pitches P1 to P3 (mm), and the groove volume of each of the lug grooves 31 corresponding to these pitches P1 to P3 is V1 to V3 (mm$^3$), when the condition P1>P2>P3 is satisfied, the groove volumes V1 to V3 of the lug groove 31 is adjusted such that the relationship V1/P1<V2/P2<V3/P3 is satisfied. Thereby, the nonuniformity of mass caused by pitch variation is reduced, and the uniformity of the pneumatic tire can be favorably maintained.

Figure 6:
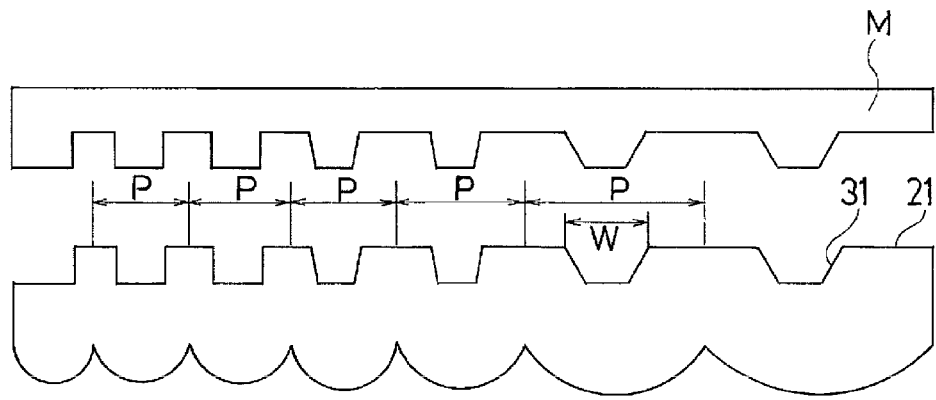
FIG. 6 is a cross-sectional view schematically illustrating the rubber volume of a shoulder land portion in the pneumatic tire of the present technology.
Figure 7:
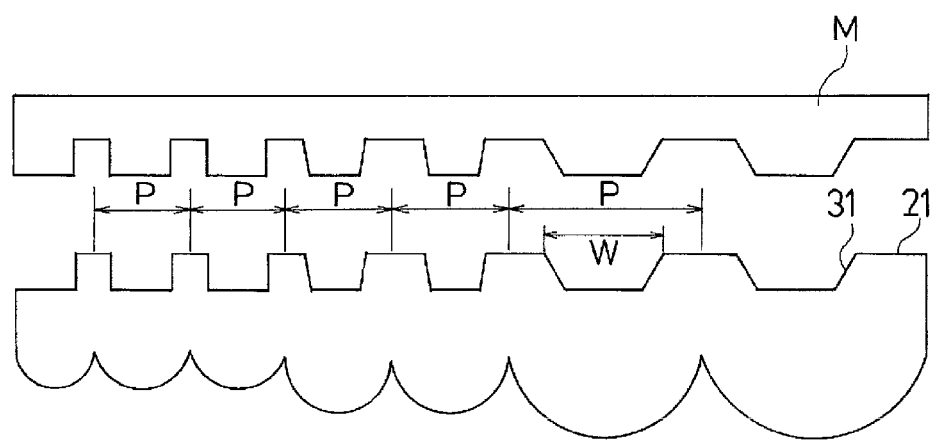
FIG. 7 is a cross-sectional view schematically illustrating the rubber volume of a shoulder land portion of the pneumatic tire configured such that the groove volume of the lug grooves changes proportional to the size of the pitch of the lug grooves.

FIG. 6 schematically illustrates the rubber volume of the shoulder land portion in the pneumatic tire of the present technology, and FIG. 7 schematically illustrates the rubber volume of a shoulder land portion of the pneumatic tire configured such that the groove volume of the lug grooves changes proportional to the size of the pitch of the lug grooves. In FIG. 6 and FIG. 7, M represents a mold. As illustrated in FIG. 7, with a pneumatic tire that adopts pitch variation in the shoulder land portion 21, the groove width W of the lug groove 31 changes proportional to the size of the pitch P of the lug groove 31, and as a result, the groove volume V changes proportional to the size of the pitch P of the lug groove 31. In this case, the nonuniformity of the mass caused by the pitch variation is increased, and the nonuniformity of mass is manifest due to the expanded structure of the road contact surface as described above. In this regard, as illustrated in FIG. 6, the ratio W/P of the groove width W of the lug groove 31 with regard to the size of the pitch P of the lug groove 31 in the shoulder land portion 21, or in other words, the ratio V/P of the groove volume V of the lug groove 31 with regard to the size of the pitch P of the lug groove 31 in the shoulder land portion 21 decreases as the pitch increases, and increases as the pitch decreases, and therefore degradation of the uniformity can be avoided.

With the aforementioned pneumatic tire, the ratio V/P of the groove volume of the lug grooves 31, 35 to the size of the pitch P of the lug grooves 31, 35 in the shoulder land portions 21, 25 should be set to a range of 0.05 to 0.10 at maximum pitch, and should be set to a range of 0.10 to 0.15 at minimum pitch. As a result, it is possible to improve the uniformity, handling stability, and uneven wear resistance in a well-balanced manner.

The ratio V/P of the groove volume V of the lug grooves 31, 35 to the size of the pitch P of the lug grooves 31, 35 in the shoulder land portions 21, 25 decreases as the pitch increases, and increases as the pitch decreases, but the following configuration can be adopted as the specific method.

Figure 8:
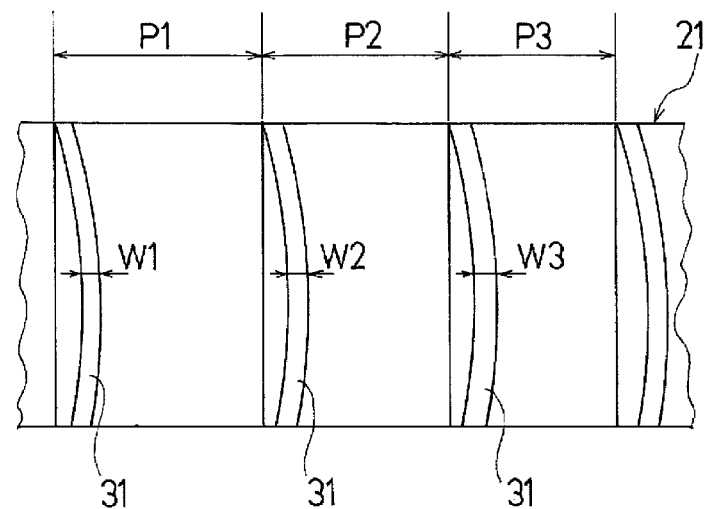
FIG. 8 is a plan view illustrating a lug groove of a shoulder land portion where the groove width was adjusted, in a pneumatic tire of the present technology.

FIG. 8 illustrates a lug groove of a shoulder land portion where the groove width was adjusted, in the pneumatic tire of the present technology. With the aforementioned pneumatic tire, in order to satisfy the relationship between the size of the pitch of the lug grooves 31, 35 and the groove volume, the ratio of the groove width of the lug grooves 31, 35 with regard to the size of the pitch of the lug grooves 31, 35 in the shoulder land portions 21, 25 can be made to decrease as the pitch increases, and to increase as the pitch decreases. For example, in FIG. 8, if the lug groove 31 of the shoulder land portion 21 has pitches P1 to P3 (mm), and the groove width of each of the lug grooves 31 corresponding to these pitches P1 to P3 is W1 to W3 (mm), when the relationship P1>P2>P3 is satisfied, the groove width W1 to W3 of the lug groove 31 is adjusted such that the relationship W1/P1<W2/P2<W3/P3 is satisfied. In this case, dimensional requirements other than the groove width may be constant, but the other dimensional requirements can also be changed at the same time.

Figure 9:
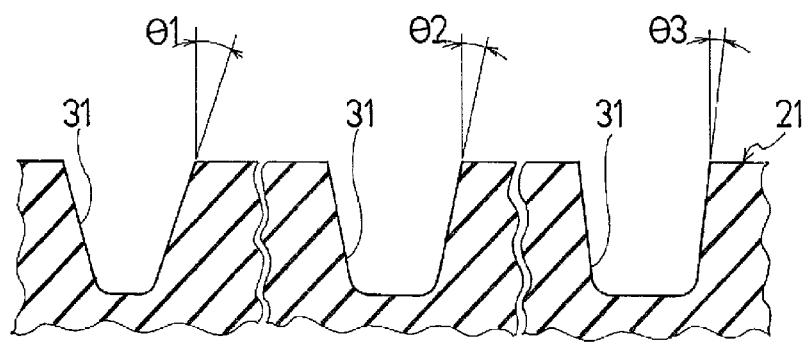
FIG. 9 is a plan view illustrating a lug groove of a shoulder land portion where the groove wall angle was adjusted, in a pneumatic tire of the present technology.

FIG. 9 illustrates a lug groove of a shoulder land portion where the groove wall angle was adjusted, in the pneumatic tire of the present technology. With the aforementioned pneumatic tire, in order to satisfy the relationship between the size of the pitch of the lug grooves 31, 35 and the groove volume, the groove wall angle of the lug grooves 31, 35 in the shoulder land portions 21, 25 can be made to increase as the pitch increases, and to decrease as the pitch decreases. The groove wall angle described herein refers to the inclination angle of the groove wall of the lug grooves 31, 35 with regard to the normal line direction of the road contact surface. For example, if the lug groove 31 of the shoulder land portion 21 has pitches P1 to P3 (mm), and the groove wall angle of each of the lug grooves 31 corresponding to these pitches P1 to P3 is θ1 to θ3 (°), when the relationship P1>P2>P3 is satisfied, the groove wall angle θ1 to 03 of the lug groove 31 is adjusted such that the relationship θ1>θ2>θ3 is satisfied in FIG. 9. In this case, dimensional requirements other than the groove wall angle may be constant, but the other dimensional requirements can also be changed at the same time.

Figure 10:
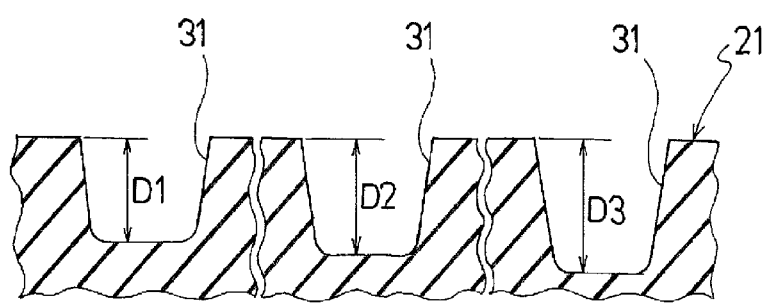
FIG. 10 is a plan view illustrating a lug groove of a shoulder land portion where the groove depth was adjusted, in a pneumatic tire of the present technology.

FIG. 10 illustrates a lug groove of a shoulder land portion where the groove depth was adjusted, in the pneumatic tire of the present technology. With the aforementioned pneumatic tire, in order to satisfy the relationship between the size of the pitch of the lug grooves 31, 35 and the groove volume, the groove depth of the lug grooves 31, 35 in the shoulder land portions 21, 25 can be made to decrease as the pitch increases, and to increase as the pitch decreases. For example, if the lug groove 31 of the shoulder land portion 21 has pitches P1 to P3 (mm), and the groove depth of each of the lug grooves 31 corresponding to these pitches P1 to P3 is D1 to D3 (°), when the relationship P1>P2>P3 is satisfied, the groove wall depth D1 to D3 of the lug groove 31 is adjusted such that the relationship D1<D2<D3 is satisfied in FIG. 10. In this case, dimensional requirements other than the groove depth may be constant, but the other dimensional requirements can also be changed at the same time.

In the aforementioned embodiment, a pneumatic tire where the mounting direction to the vehicle was specified was described, but the present technology can also be applied to a pneumatic tire where the mounting direction to the vehicle is not specified. With this type of pneumatic tire as well, degradation of the uniformity can be avoided while achieving an effect of improving the handling stability and the uneven wear resistance.

EXAMPLES

Tires for Examples 1 to 5 were fabricated as a pneumatic tire that utilizes pitch variation including three types of pitches with different sizes and which has the tread pattern illustrated in FIG. 1 in a tire size of 235/40 ZR18 95Y, where the profile line that defines the road contact surface of the center land portion protrudes further to the outer side in the tire radial direction than the standard profile line, and the profile line that defines the road contact surface of the middle land portion and the shoulder land portion protrudes further to the outer side in the tire radial direction than does the standard profile line, and the ratio of the groove volume of the lug grooves to the size of the pitch of the lug grooves in the shoulder land portion decreases as the pitch increases, and increases as the pitch decreases. With the tires of Examples 1 to 5, the maximum protrusion amount T1 of the center land portion, the maximum protrusion amounts T2A, T2B of the middle land portion and the shoulder land portion, and the ratio V/P of the groove volume of the lug grooves to the size of the pitch of the lug grooves at the maximum pitch and the minimum pitch were set as indicated in Table 1.

For comparison, a conventional tire was prepared with the same configuration as Example 1 except that the profile line that specifies the ground contact surface of each land portion was made to match the standard profile line, and the ratio V/P of the groove volume of the lug groove with regard to the size of the pitch of the lug groove was constant. Furthermore, a tire according to Comparative Example 1 was prepared with the same configuration as Example 1 except that the ratio V/P of the groove volume of the lug groove with regard to the size of the pitch of the lug groove was constant.

The test tires were evaluated for handling stability, uneven wear resistance, and uniformity according to the following evaluation methods. The results thereof are shown in Table 1.

Handling Stability:

The test tires were assembled on a wheel with a rim size of 18×8.0J and mounted on a sedan test vehicle with an engine displacement of 2000 cc. The handling stability on a test course with a dry road surface was evaluated by sensory evaluation under conditions where the air pressure was 230 kPa. Evaluation results were expressed as index values with the Conventional Example being defined as 100. Larger index values indicate superior steering stability.

Uneven Wear Resistance:

The test tires were assembled on a wheel with a rim size of 18×8.0J and mounted on a sedan test vehicle with an engine displacement of 2000 cc. A traveling test of 10000 km was performed under conditions where the air pressure was 230 kPa, and then the amount of wear of the center land portion and the shoulder land portions was measured, and a ratio of the amount of wear of each portion was calculated.

Evaluation results were expressed as index values with the Conventional Example being defined as 100. Larger index values indicate superior uneven wear resistance.

Uniformity:

The test tires were mounted on a uniformity measuring device, and the radial force variation (RFV) was measured. The evaluation results were expressed, using the inverse value of the measurement value, as index values with the results of the Conventional Example being defined as 100. Larger index values indicate favorable uniformity.

TABLE 1-1

|  |  | Conventional Example | Comparative Example 1 | Example 1 | Example 2 | Example 3 |
|---|---|---|---|---|---|---|
| Maximum Projection Amount T1 (mm) | | 0 | 0.3 | 0.3 | 0.3 | 0.3 |
| Maximum Projection Amount T2A (mm) | | 0 | 1.5 | 1.5 | 1.5 | 1.5 |
| Maximum Projection Amount T2B (mm) | | 0.0 | 1.2 | 1.2 | 1.2 | 1.2 |
| Lug Groove Volume Ratio V/P | Maximum Pitch | 8.0 | 8.0 | 5.0 | 8.0 | 5.0 |
| | Minimum Pitch | 8.0 | 8.0 | 8.0 | 10.0 | 10.0 |
| Steering Stability (index value) | | 100 | 105 | 105 | 103 | 105 |
| Uneven Wear Resistance (Index) | | 100 | 110 | 108 | 107 | 105 |
| Uniformity (index) | | 100 | 95 | 101 | 100 | 105 |

TABLE 1-2

|  |  | Example 4 | Example 5 | Example 6 | Example 7 | Example 8 |
|---|---|---|---|---|---|---|
| Maximum Projection Amount T1 (mm) | | 0.3 | 0.3 | 0.5 | 0.3 | 0.3 |
| Maximum Projection Amount T2A (mm) | | 1.5 | 1.5 | 1.5 | 0.8 | 1.8 |
| Maximum Projection Amount T2B (mm) | | 1.2 | 1.2 | 1.2 | 0.8 | 1.8 |
| Lug Groove Volume Ratio V/P | Maximum Pitch | 5.0 | 5.0 | 5.0 | 5.0 | 5.0 |
| | Minimum Pitch | 15.0 | 18.0 | 8.0 | 8.0 | 8.0 |
| Steering Stability (index value) | | 105 | 105 | 105 | 103 | 108 |
| Uneven Wear Resistance (Index) | | 103 | 101 | 108 | 108 | 108 |
| Uniformity (index) | | 108 | 110 | 101 | 103 | 100 |

As can be seen from Table 1, with the tires of Examples 1 to 5, in contrast to the Conventional Example, the handling stability and uneven wear resistance could be improved while avoiding degradation of the uniformity. On the other hand, the tire of Comparative Example 1 was found to have an effect of improving the handling stability and uneven wear resistance, but degradation of uniformity was significant.

The invention claimed is:

1. A pneumatic tire where a pair of center main grooves extending in a tire circumferential direction are provided on both sides of an equatorial plane of the tire in a tread portion, a shoulder main groove extending in the tire circumferential direction is provided on an outer side in a tire width direction of each center main groove, a center land portion is demarcated between the center main grooves, a middle land portion is demarcated by one of the center main grooves and one of the shoulder main grooves, a shoulder land portion is demarcated on the outer side in the tire width direction by the one of the shoulder main grooves, a plurality of lug grooves extending in the tire width direction are provided in each shoulder land portion at intervals in the tire circumferential direction, and a pitch of these lug grooves is changed on a tire circumference; wherein from a viewpoint of a tire meridian cross section, when a standard profile line forming an arc of a circle that passes through both endpoints in the tire width direction of the pair of center main grooves is assumed, a profile line that defines a road contact surface of the center land portion protrudes to the outer side in a tire radial direction than does the standard profile line, and a profile line that includes both endpoints in the tire width direction of the shoulder main grooves and an outer endpoint in the tire width direction of the center main grooves, that is formed of a single arc of a circle crossing over the middle land portion and the shoulder land portion, and that defines the road contact surface of the middle land portion and the shoulder land portion protrudes further to the outer side in the tire radial direction than does the standard profile line, and a ratio of a groove volume of the lug grooves to a size of the pitch of these lug grooves in the shoulder land portion decreases as the pitch increases, and increases as the pitch decreases, wherein both endpoints of the center main grooves and both end points of the shoulder main grooves are inflection points between a tread surface of the tread portion and a groove sidewall of respective center and shoulder main grooves;

a maximum projection amount to the outer side in the tire radial direction of the profile line of the center land portion with respect to the standard profile line is from 0.2 to 0.5 mm; and a maximum projection amount to the outer side of the tire radial direction of the profile line of the shoulder land portion and the middle land portion with respect to the standard profile line is from 0.6 to 2.0 mm.

2. The pneumatic tire according to claim 1, which is a pneumatic tire where a mounting direction to a vehicle is specified, wherein the maximum projection amount to the outer side in the tire radial direction of the profile line of the shoulder land portion and the middle land portion with respect to the standard profile line is relatively larger on the outer side of the vehicle than on an inner side of the vehicle.

3. The pneumatic tire according to claim 2, wherein a ratio of groove width of the lug grooves with regard to the size of the pitch of the lug grooves in the shoulder land portion is reduced as the pitch increases, and is increased as the pitch decreases.

4. The pneumatic tire according to claim 3, wherein a groove wall angle of the lug grooves in the shoulder land portion is reduced as the pitch decreases, and is increased as the pitch increases.

5. The pneumatic tire according to claim 4, wherein a groove depth of the lug grooves in the shoulder land portion is reduced as the pitch increases, and is increased as the pitch decreases.

6. The pneumatic tire according to claim 1, wherein a ratio of groove width of the lug grooves with regard to the size of the pitch of the lug grooves in the shoulder land portion is reduced as the pitch increases, and is increased as the pitch decreases.

7. The pneumatic tire according to claim 1, wherein a groove wall angle of the lug grooves in the shoulder land portion is reduced as the pitch decreases, and is increased as the pitch increases.

8. The pneumatic tire according to claim 1, wherein a groove depth of the lug grooves in the shoulder land portion is reduced as the pitch increases, and is increased as the pitch decreases.

* * * * *